US010020558B1

(12) United States Patent
Sanner et al.

(10) Patent No.: US 10,020,558 B1
(45) Date of Patent: Jul. 10, 2018

(54) AUTO TRACKING ANTENNA PLATFORM

(71) Applicant: The United States of America as Represented by the Administrator of NASA, Washington, DC (US)

(72) Inventors: Kurt G Sanner, Tehachapi, CA (US); Evan J Kaiser, Auburn, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 467 days.

(21) Appl. No.: 14/714,756

(22) Filed: May 18, 2015

(51) Int. Cl.
*F16M 1/00* (2006.01)
*H01Q 1/12* (2006.01)

(52) U.S. Cl.
CPC ................................ *H01Q 1/1264* (2013.01)

(58) Field of Classification Search
USPC .......................................................... 248/652
See application file for complete search history.

(56) References Cited

U.S. PATENT DOCUMENTS 3,728,733 A 4/1973 Robinson
4,691,207 A * 9/1987 Timineri ................ F16M 11/10 342/359
5,419,521 A * 5/1995 Matthews .............. F16M 11/10 248/179.1
5,453,753 A 9/1995 Cosenza et al.
5,517,204 A * 5/1996 Murakoshi ............... H01Q 1/18 248/183.1
6,023,247 A * 2/2000 Rodeffer .................. H01Q 1/18 343/765
6,204,823 B1 * 3/2001 Spano .................... H01Q 1/125 343/705
6,911,950 B2 * 6/2005 Harron ..................... H01Q 3/08 343/765
6,914,578 B1 7/2005 Menahein
7,453,409 B2 * 11/2008 Zimmerman ............ H01Q 1/28 343/765
7,663,565 B2 * 2/2010 Son ........................ H01Q 1/125 248/183.1

(Continued)

OTHER PUBLICATIONS

The Cobham Defense Systems, Rotating Electra Mechanical Microwave Sub-Systems. Radar and R.F. Microwave Products Brochure (2013).

*Primary Examiner* — Monica E Millner
(74) *Attorney, Agent, or Firm* — Mark Homer

(57) ABSTRACT

The present invention is an auto tracking antenna platform upon which multiple antenna elements can be mounted to track a common moving object. The antenna tracking platform generally comprises a bottom pedestal enclosing a rotary azimuth actuator for controlled-rotary motion about the single vertical (z) axis, and an upper multi-tier framework housing a horizontal antenna-mounting beam pivotally supported for rotation about a horizontal (x) axis, and a drive assembly for direct-drive rotation of the antenna-mounting bar. Antenna elements are mounted along the horizontal mounting bar and the feeds routed through the azimuth actuator. This enables the use of fiber optic rotary joints or slip rings to pass data and video, instead of RF (waveguide) rotary joints which are required to pass high power RF signals.

10 Claims, 6 Drawing Sheets

(56) References Cited

U.S. PATENT DOCUMENTS

| | | | | |
|---|---|---|---|---|
| 7,683,845 | B2 * | 3/2010 | Wynn .................... | H01Q 1/421<br>343/757 |
| 8,120,541 | B2 * | 2/2012 | Jung .................... | H01Q 1/1257<br>343/765 |
| 8,180,187 | B2 | 5/2012 | Bunch et al. | |
| 8,314,735 | B2 | 11/2012 | Park | |
| 9,054,409 | B2 * | 6/2015 | Zimmerman ............ | H01Q 3/08 |
| 9,812,776 | B2 * | 11/2017 | Yano ........................ | H01Q 3/08 |
| 2002/0084948 | A1 * | 7/2002 | Watson .................. | H01Q 1/125<br>343/882 |
| 2008/0303900 | A1 | 12/2008 | Stowe et al. | |
| 2010/0164817 | A1 | 7/2010 | Kaplan | |

* cited by examiner

AUTO TRACKING ANTENNA PLATFORM

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND a. Field of Invention

The invention relates to antenna systems and, more particularly, to an auto-tracking antenna platform for tracking a plurality of antenna elements to follow a moving signal source.

b. Background of the Invention

An antenna tracking system tracks an antenna to follow a moving signal source, such as a communication satellite or aircraft. Typically the antenna is tracked according to a predetermined search pattern which causes a variation in the signal amplitude depending upon the relative location of the target versus the antenna position. An antenna control unit points the antenna in order to maintain optimum signal strength.

There are many applications for automatic antenna tracking systems. For example, unmanned aerial vehicles (UAVs) typically use multiple antennas for command and control, video, payload data, and telemetry data, all of which need to communicate with a ground control station. This requires one or more ground based tracking antennas to follow the UAV as it flies on its route. The antennas have to keep their main beams pointing at the in-flight UAV in order to maintain strong video and communication links from the UAV to the ground station.

When the UAV moves vertically or horizontally relative to the vector formed by an antenna pointing at the UAV, then the antenna's signals sent and received from the UAV become weaker. The antenna controller can thus detect movement of the UAV due to the weaker signal, but the direction of movement is unknown. "Monopulse" antenna tracking systems are often used where, in addition to the main antenna beam, there are additional beams used for tracking. Monopulse antennas typically use four antenna elements and the signals received from the additional elements are used to determine the direction of UAV movement. In the current invention, an external computational element is required to determine the pointing direction of the tracking antennas. The GPS coordinates of the UAV and ground station are used in the prototype to determine the required pointing angle of the antenna. In practice, any system, including a monopulse antenna tracking system can be used by an antenna tracking controller to calculate the proper pointing direction of the antennas and send the appropriate control signals to the elevation and azimuth motors, but a tracking controller system which uses a computational element that inputs the GPS coordinates of the UAV and the tracking antenna to calculate the location of the UAV with respect to the tracking antenna is significantly cheaper and simpler.

Given this information from the tracking controller, a suitable tracking platform is needed to mechanically rotate the antenna elements in space. The mechanically rotated tracking antennas should be capable of being rotated 360° in azimuth and more than 180° in elevation to give hemispherical coverage above, slightly below, and around the ground station. The need to aim below the horizon is present when the tracking antenna is located at the top of a ridge or hill and needs to aim the antennas down at a UAV flying below the elevation of the tracking antenna. The current design allows aiming down 20 degrees, providing 220 degrees of rotation in elevation. Existing antenna pedestal solutions on which multiple antennas are mounted, are designed for long range tracking which requires high power RF output, whose weight is in the range of thousands of pounds, cost from hundreds of thousands to millions of dollars, and whose motors require a lot of torque to move the antennas and hold the weight of the antennas that is creating a moment on the rotating joint. High voltage power lines or stand-alone generators are additional required components of these large tracking antennas. Conventional small tracking antennas are not able to rotate continuously about azimuth as their antenna cables get wound about the pedestal which will eventually stress the cables to failure. When the antenna is rotated to its turning limit, it has to turn in the opposite direction to unwind the cables, and during that time the ground station loses RF link with the aircraft as its antennas are not pointed at the aircraft antennas. It is well-known to use RF rotary joints to avoid this problem. An RF rotary joint is a form of RF connector that allows free rotation without performance degradation. However, these are a very expensive solution, costing upwards of $30K for one antenna. Furthermore, an RF rotary joint only works within a limited bandwidth of frequencies. One RF rotary joint is required for every frequency band used by the antennas on the tracking antenna, adding cost to the tracking antenna system. The signal path for a tracking antenna's outgoing command and control signals using an RF rotary joint is as follows. A computer produces a data stream which is sent to an RF transmitter. The RF transmitter adds this data stream to a radio (RF) signal with enough power to send it through the air to a matching receiver in the UAV. Because the transmitter is on the ground, the high power RF signal is sent through an RF-rated coaxial cable up to the RF rotary joint. At this point, the RF signal enters the RF rotary joint, which is a hollow metal conduit that is designed to allow certain RF frequencies to pass without diminishing the signal strength. On the upper side of the RF rotary joint which is moving with the antennas, the RF rotary joint ends in another coax cable which is connected directly to the antenna. The tracking antenna system is turning the antennas to keep them pointed at the object being tracked, in this example a UAV. The antenna is mounted on a bar or arm which produces significant torque on the elevation motor unless it is counterbalanced with a mass built for this purpose, because the mass of the coax cable is insufficient to counterbalance the antenna hanging off the antenna mount.

For example, U.S. Pat. No. 6,914,578 to Menahem issued Jul. 5, 2005 (lapsed) shows a generic articulating pedestal mount having a pedestal base 14 with a lower vertical cylinder 16 and rotatable upper vertical cylinder 18, a lower motor 32 in the lower vertical cylinder 16 for driving the upper vertical cylinder 18, and a top-most horizontal cylinder (tubular main-shaft 42) geared to an upper motor for rotation. A generic "a rotary joint 21" is used. Shaft 42 drives an offset mount upon which a single antenna is mounted, and this produces significant torque. It would be desirable to provide a tracking pedestal that would allow customers to mount their own radios from multiple vendors on the pedestal, power the antenna radios and tracking antenna motors with conventional 120 VAC low (15) amp power, mount the antenna system on the ground or in the bed of a truck without a load bearing floor, and readily swap between wide angle, short range and high gain directional antenna elements depending on the operation without a need to change components other than the antennas and their associated radios. The present inventors herein provide an auto tracking antenna solution that allows counterbalancing of the antenna(s) about their rotating axis with their associated transmitter, receiver, or transceiver in order to minimize torque such that no additional counter weights are required, and the motors do not have to be sized sufficiently large to produce sufficient holding torque to hold the antenna off the rotating joint without being counterbalanced. By placing the RF-power producing transmitters above the rotating joint, the need for expensive RF rotary joints which can pass a high powered RF signal is removed, and inexpensive slip rings can be used to pass the fundamental data through the rotational coupling up to the radios.

SUMMARY OF THE INVENTION

It is, therefore, an object of the present invention to provide an auto-tracking antenna platform capable of being continuously rotated through 360° in azimuth and 220° in elevation to give hemispherical coverage above, slightly below, and around the ground station. The tracking station also uses a horizontal antenna mounting beam that allows customers to swap in their own antenna elements and radios from multiple vendors, allowing simultaneous use of multiple wide angle, short range, and high gain directional antenna elements depending on the operation without a need to change components other than the antennas.

It is another object to provide an auto-tracking antenna platform that allows counterbalancing of the antenna(s) in order to minimize torque, thereby minimizing both the need for additional counter weights and system cost by enabling the use of less expensive components, and reducing the size of the antenna system for convenient use on the ground or in the bed of a truck without a load bearing floor.

The present inventors herein provide an auto tracking antenna solution upon which multiple antennas can be mounted to track a common object. The platform is capable of continuous rotation in azimuth and vertically +/−110 degrees (for a total of 220 degrees of rotation about the horizontal axis) in elevation. The antenna tracking platform generally comprises a stationary bottom pedestal enclosing a rotary azimuth actuator for controlled-rotary motion about the single vertical (z) axis, and a multi-tier support framework rotatably supported on the pedestal. The support framework defines a first tier including a horizontal antenna-mounting bar pivotally supported for rotation about a horizontal (x) axis, and a second tier comprising a drive assembly for direct-drive rotation of the antenna-mounting bar. Antenna elements are mounted along the horizontal mounting bar and the antenna feeds are routed through the azimuth actuator, which comprises a motor rotating a hollow shaft bearing through which the RF antenna feeds are carried. This enables the use of one hybrid fiber optic rotary joint or hybrid slip ring assembly instead of a set of stacked RF (waveguide) rotary joints. (The term, 'hybrid' refers to the assembly of power and signal passing electrical components in one device) Fiber optic rotary joints and slip rings are both an order of magnitude cheaper and lighter than RF rotary joints and enable continuous rotation. Slip rings are the cheaper of the two, and do not require signal-to-fiber converters on the upper and lower side of the rotary joint, making them the least expensive option as a component for construction of the tracking antenna. Fiber optic rotary joints may be substituted for the slip rings by the manufacturer if it becomes technically desirable, for example with extremely high data rate signals.

The design disclosed herein also allows counterbalancing of the antenna elements to compensate for the weight of the antennas, which allows for smaller azimuth and elevation motors to be used. Moreover, the antennas are mounted on a rotating horizontal bar which maintains them all in close proximity to the axis of rotation when rotating through elevation. This minimizes the inertial moment for the elevation motor, and allows it to be small, inexpensive and low power. It also minimizes the necessary counterbalance weight.

The platform tracks moving objects using the object's GPS coordinates and the GPS coordinates of the antenna. The auto tracking antenna updates its aiming position at a 30 Hz frequency (or 30 times per second). The design of the antenna platform allows it to be light weight (under 100 lbs), low power (runs on a single conventional 120 VAC, 15 amp power supply), quickly reconfigurable to support different antennas (lengths, types, and number), open interface, and relatively low cost.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENTS

The present invention is an improved rotating antenna mounting platform for mounting multiple antennas for continuous rotation in azimuth and vertically +/−110 degrees in elevation, all to track a common object.

Figure 1:
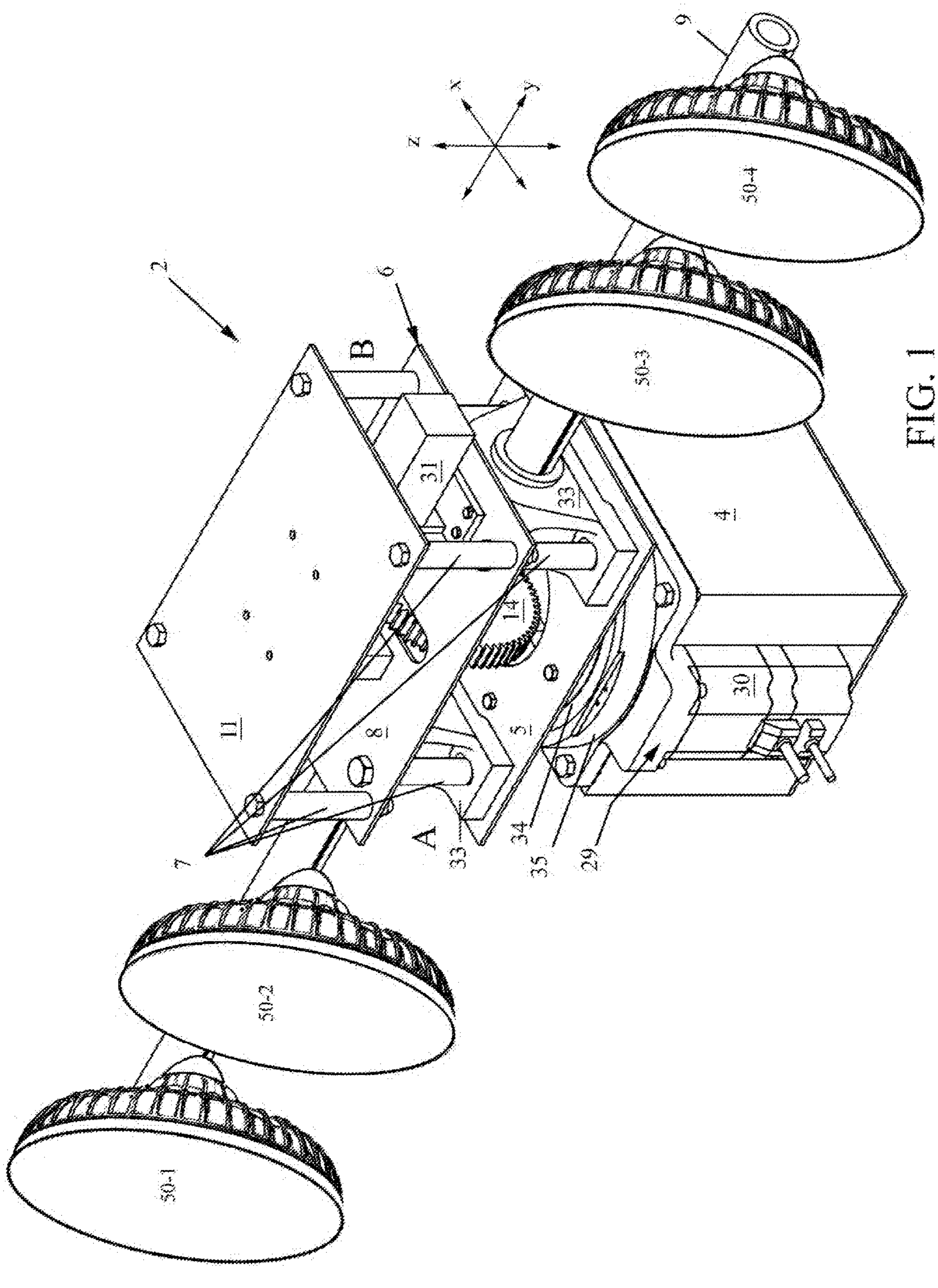
FIG. 1 is a perspective view of an antenna mounting platform 2 according to an embodiment of the invention.
Figure 2:
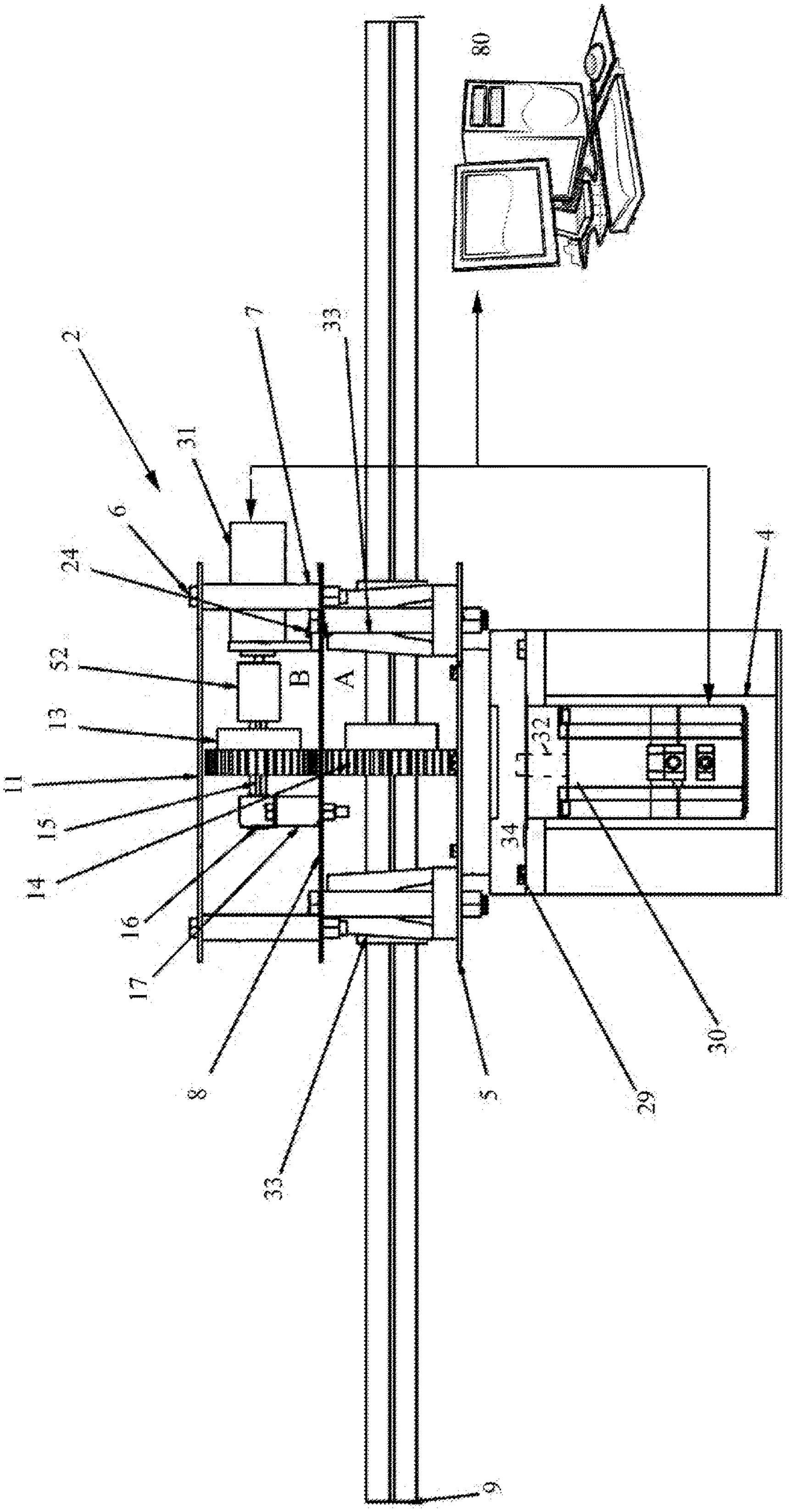
FIG. 2 is a front view of the antenna mounting platform 2 of FIG. 1
Figure 3:
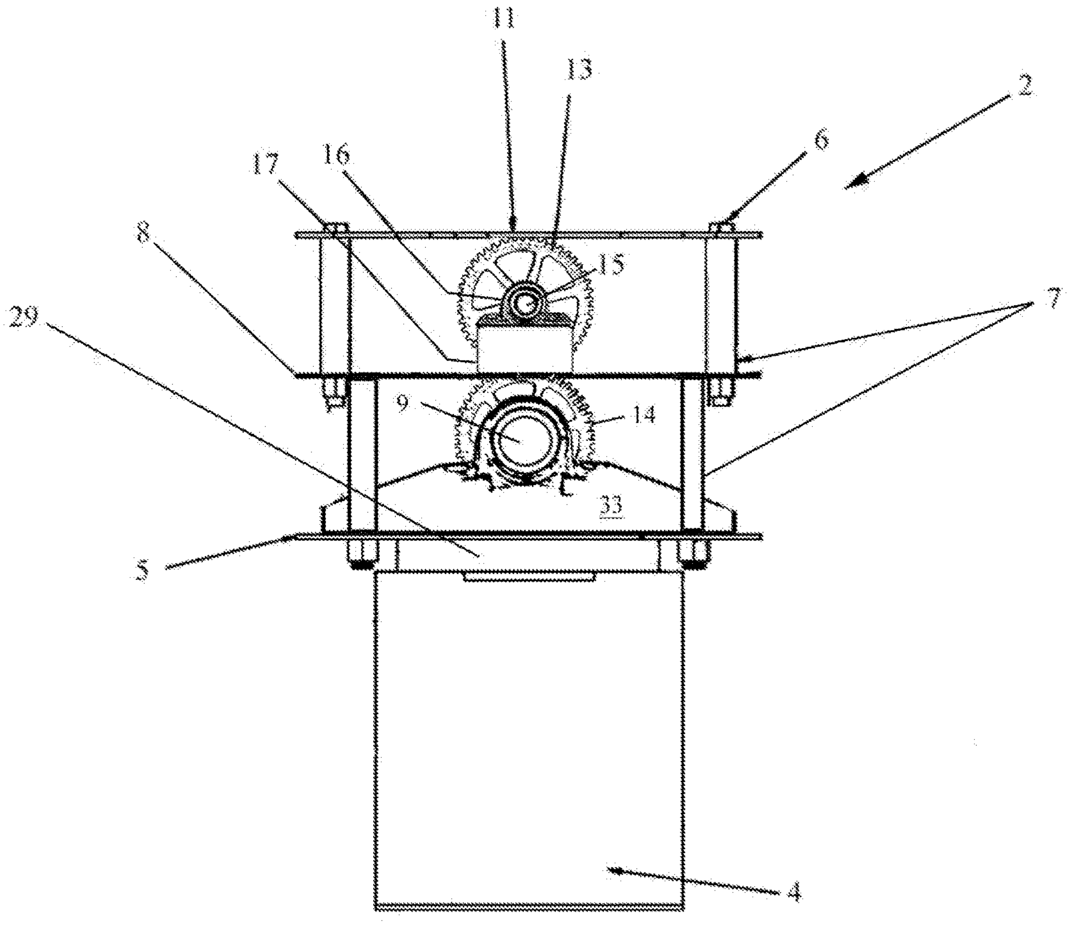
FIG. 3 is a side view of the antenna mounting platform 2 of FIGS. 1-2.

FIG. 1 is a perspective view of an antenna mounting platform 2 according to an embodiment of the invention, FIG. 2 is a front view, and FIG. 3 is a side view. With combined reference to FIGS. 1-3, the antenna mounting platform 2 generally comprises a stationary bottom pedestal 4 enclosing a rotary actuator assembly 29, and a multi-tier framework 6 rotatably supported on the pedestal 4 for continuous rotation about a vertical (z) axis. The multi-tier framework 6 supports a horizontal antenna-mounting beam 9, which is a hollow tubular member that protrudes on both sides of the platform 2. Any number of antenna elements 50-1 . . . *n* can be mounted along the beam 9. The mounting beam 9 is directly-driven by a stepper-motor 31 also mounted in framework 6 for hemispherical rotation about a horizontal (y) axis.

As seen in FIG. 2, the rotary actuator assembly 29 comprises an azimuth motor 30 that extends a geared pinion 32 (FIG. 2 dotted lines) vertically upward to engage a hollow rotary stage 34.

Figure 4:
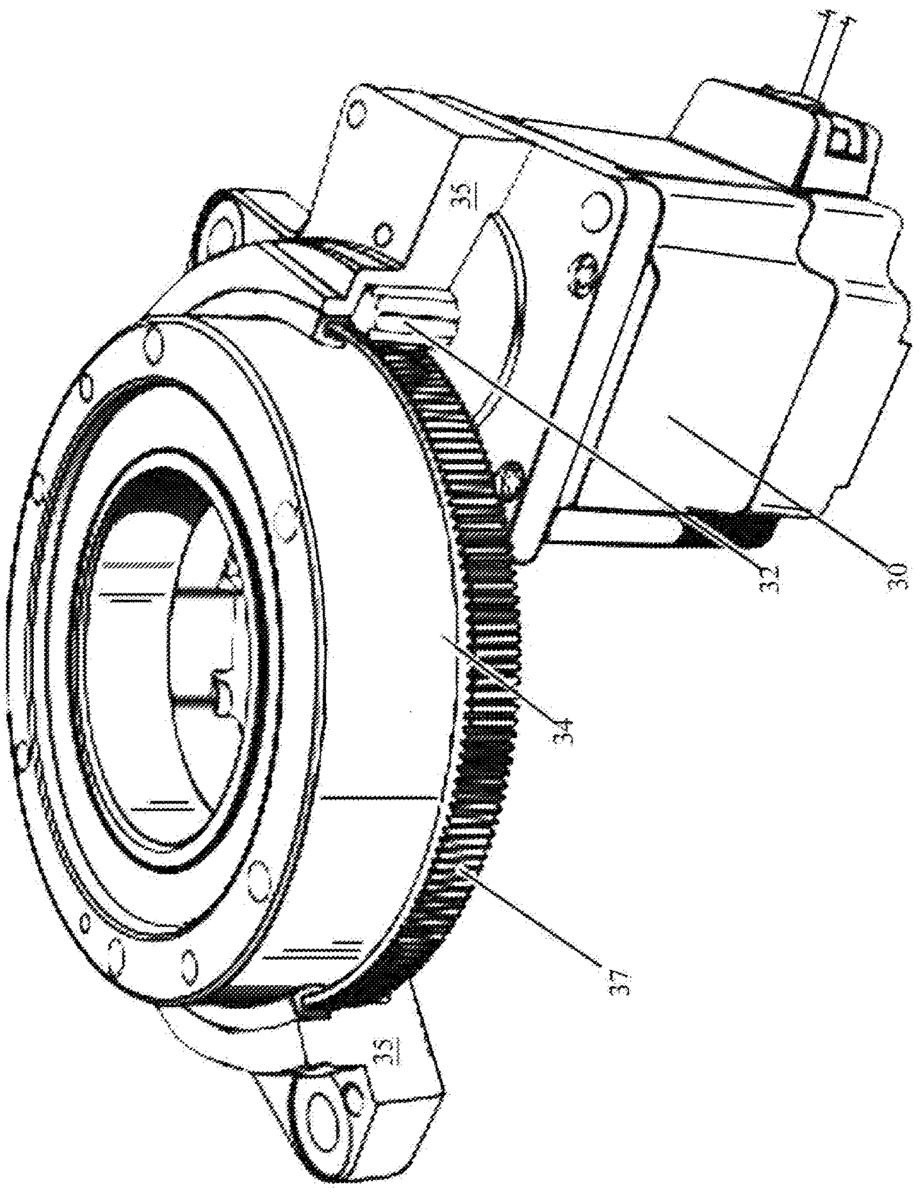
FIG. 4 is an enlarged illustration of the rotary actuator assembly 29 used in the antenna mounting platform 2 of FIGS. 1-3.

As seen more clearly in FIG. 4, the rotary stage 34 is constrained within a stationary base 35 affixed to the top of pedestal 4. The rotary stage 34 includes a radial gear 37 around its lowermost periphery for engaging pinion 32, so that pinion 32 directly-drives stage 34 to rotate it about vertical axis (z). The rotary stage 34 is constrained within base 35 and is seated atop a suitable set of mechanical roller bearings (not shown). Suitable rotary actuator assemblies 29 are commercially available from Oriental Motor USA, Inc. as their DGII Series Rotary Actuator™ line, which are available in 60 mm, 85 mm, 130 mm and 200 mm frame sizes depending on the maximum torque, thrust load and high moment loading specifications of the intended use. For azimuth motor 30, these commercially available rotary actuator assemblies 29 include a highly efficient and energy saving AR Series closed loop motor (likewise from Oriental Motor USA, Inc.) which affords high accuracy positioning.

The rotary stage 34 entirely supports the multi-tier framework 6 rotatably on the pedestal 4 and facilitates its controlled-rotary motion about the single vertical (z) axis, the azimuth motor 30 mounted in the pedestal 10 driving the motion.

Referring back to FIGS. 1-2, framework 6 defines a lower tier A and upper tier B. The lower tier A of framework 6 includes the elongate horizontal antenna-mounting beam 9 and support structure for rotation of the antenna-mounting beam 9 about a horizontal (x) axis.

The upper tier B houses stepper-motor 31 for direct-drive rotation of the antenna-mounting bar 9. Both vertically-stacked tiers A, B are defined by three flat rectangular plates 5, 8, 11 separated and affixed in a sandwich configuration by corner-mounted standoffs 7. As best seen in FIG. 2, stepper motor 31 is mounted within the upper tier B and drives a first spur gear 13 about the horizontal axis (x). The presently preferred stepper motor 31 will have a basic step angle within a range of from 1-2 degrees, more preferably 1.4-2 degrees, and most preferably 1.8 degrees. A suitable stepper motor is commercially available from Oriental Motor USA, Inc. as their model PK244PDA. First spur gear 13 engages a second spur gear 14 mounted on antenna-mounting bar 9 through an aperture in the middle plate 8, and thereby rotates antenna-mounting bar 9 through the two spur gears 13, 14. This way, the antenna-mounting bar 9 remains in the x-y plane (level with the horizon) as the azimuth motor 30 turns the hollow rotary stage 34, which in turn rotates frame 6 to rotate about the vertical (z) axis.

As seen in FIG. 1, multiple antenna elements 50-1 . . . *n* may be attached in a conventional manner on both sides of the antenna-mounting beam 9. In accordance with the invention, antennas 50-1 . . . *n* should be equally divided by mass between the left and right sides of antenna-mounting bar 9 and should be mounted as closely as possible to the pedestal 4 to appropriately control the center of mass, keeping it uniformly distributed about the pedestal 4, while minimizing the moment of inertia by keeping the antennas 50-1 . . . *n* located as close to the center of the pedestal 4 as possible. Where possible, all associated antenna receivers, transmitters, and transceivers needed to connect to the antennas 50-1 . . . *n* will also be attached to the backside of the antenna-mounting beam 9 (facing away from antennas 50-1 . . . *n*) so that they counterbalance the weight of antenna(s) 50-1 . . . *n*, thereby minimizing torque due to gravity on the antenna-mounting bar 9. When the stepper motor 31 rotates the antenna-mounting bar 9, all antenna elements 50-1 . . . *n* attached to the antenna-mounting bar 9 along with their attached transmitters, receivers, and transceivers are rotated in unison, changing their elevation angle and keeping the center of mass located at or very near the center of the antenna-mounting bar 9. When the azimuth motor 30 rotates the frame 6, the antenna-mounting beam 9 is thereby rotated about the azimuth plane, keeping all antennas 50-1 . . . *n* pointed to the same azimuth (compass) angle.

Looking more closely at FIG. 2, it can be seen that the stepper motor 31 is mounted horizontally on the middle plate 8 by a mounting bracket 24 comprising an angled bracket which provides a horizontal footer for screw-affixation to middle plate 8 and a vertical yoke for supporting the stepper motor 31 centrally between plates 8 and 11. The shaft of stepper motor 31 is coupled to the shaft of the first spur gear 13 via a shaft coupling 52 which accommodates variation in shaft size. Shaft coupling 52 may be, for example, a conventional 5⁄16-½" shaft coupling. Spur gear 13 may be a 3" gear with its own shaft. On the facing side the spur gear 13 shaft 15 continues into a pillow block bearing 16 mounted atop a spacer block 17, which together support one end of the rotating spur gear shaft.

As indicated previously the middle plate 8 is provided with a small rectangular aperture, and first spur gear 13 engages a second spur gear 14 through the aperture to achieve a geared reduction. The second spur gear 14 resides in lower tier A of frame 6 and is mounted collar-like on antenna-mounting beam 9. The second spur gear 14 is slightly larger than first spur gear 13 to achieve geared-reduction as a metter of design choice, and a 3/5 ratio is presently preferred. Antenna-mounting beam 9 is rotatably supported within the lower tier B between plates 8 and 5 by a pair of pillow block bearings 33.

The horizontal beam 9 on which the antenna elements 50-1 . . . *n* are mounted is allowed to rotate 360 degrees azimuth but only +/−110 degrees from vertical. This means the antennas 50-1 . . . *n* may point 20 degrees below the horizon to straight up, and all angles in between, but the beam 9 will not rotate them past a straight down position. The raw data and video feeds from antenna element 50-1 . . . *n*, Txs, Rxs, and XCVRs are passed along the beam 9 to the middle of the assembly, then down the center of the rotary actuator assembly 29 and pedestal 4 to remote equipment. This enables the use of fiber optic rotary joints or slip ring assemblies instead of RF (waveguide) rotary joints because only data and video are being passed through the rotary joint, not the high power RF signal from the antenna.

Thus, all telemetry data and video cable connections to the antenna receivers and transmitters mounted on the rotating beam 9 are connected to remote equipment through a fiber optic rotary joint (FORJ) 60 or slip ring assembly mounted at the hollow center of the pedestal assembly 4. The connections to the lower stationary portion of the FORJ/Slip Ring Assembly 60 are routed directly down through the center of the rotary actuator assembly 29 to the remote equipment. The connections to the upper rotating portion of the FORJ/Slip Ring Assembly 60 are routed directly along the length of the antenna mounting bar 9 to their respective receivers, transmitters, and transceivers. The use of the FORJ/Slip Ring Assembly 60 prevents the fiber optic cables from becoming twisted about the lower pedestal 4 as the upper frame 6 is rotated, thereby enabling continuous rotation about the azimuth axis. Fiber optic rotary joints are small and relatively inexpensive at $1K for one data channel. Slip rings pass power as well through the same rotational coupling. All-slip ring assemblies pass data and power through slip rings mounted in one rotational coupling, which can cost half the price of a fiber optic rotary joint, but which have limitations of higher signal noise and lower data rates than fiber optic rotary joints, and so there are cases in which FORJs are required.

The two motors 30, 31 are driven by an external computer controller 80 running software which calculates an aiming solution from the target's GPS coordinates and the antenna's GPS coordinates. A variety of aiming software solutions are well-known.

Figure 5:
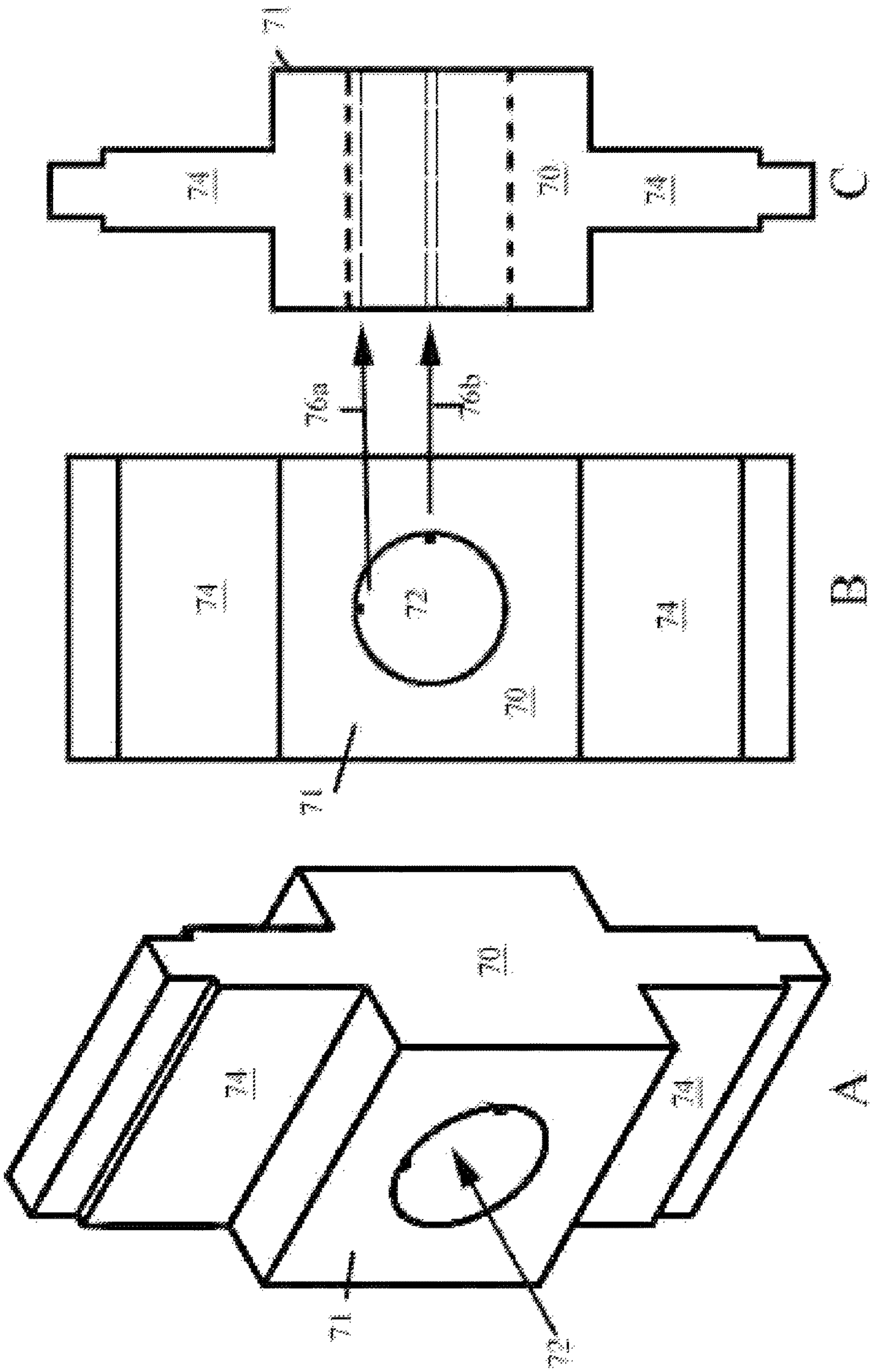
FIG. 5 is a composite perspective view (A), front view (B), and side cross-section (C) of the antenna mounting bracket 70, which holds both the antenna and its corresponding transmitter or receiver at a chosen location on the antenna-mounting beam 9.

FIG. 5 shows an exemplary antenna mounting bracket 70 each suitable for counter-balanced mounting of one the of antenna elements 50-1 . . . *n* including its associated antenna receiver and transmitter on the rotating beam 9. Antenna mounting bracket 70 generally comprises a symmetrical block 71 defined by a central through-hole 72, and upper and lower mounting flanges 74 extending from the block 71. An antenna and its associated receiver may be affixed to mounting flanges 74. Preferably, the central through-hole 72 of block 71 is provided with one or more coaxial ribs 76*a*, 76*b* running along the interior wall, e.g., at 0 and 90 degrees. Rib(s) 76*a*, 76*b* are dimensioned to fit within corresponding slots (see FIG. 1) running along the rotating beam 9 for keying the antenna mounting brackets to a fixed angular orientation. Alternatively, rib(s) 76*a*, 76*b* may be replaced by slots and the rotating beam 9 equipped with ribs to accomplish the same. Although FIG. 5 shows two key ribs/slots 76*a*, 76*b*, only one of these is needed for a particular antenna to ensure that all antennae along the rotating beam 9 are aligned to point in the same direction, and will not slip on the rotating beam 9 when it is rotated in the process of tracking a UAV as it moves.

Figure 6:
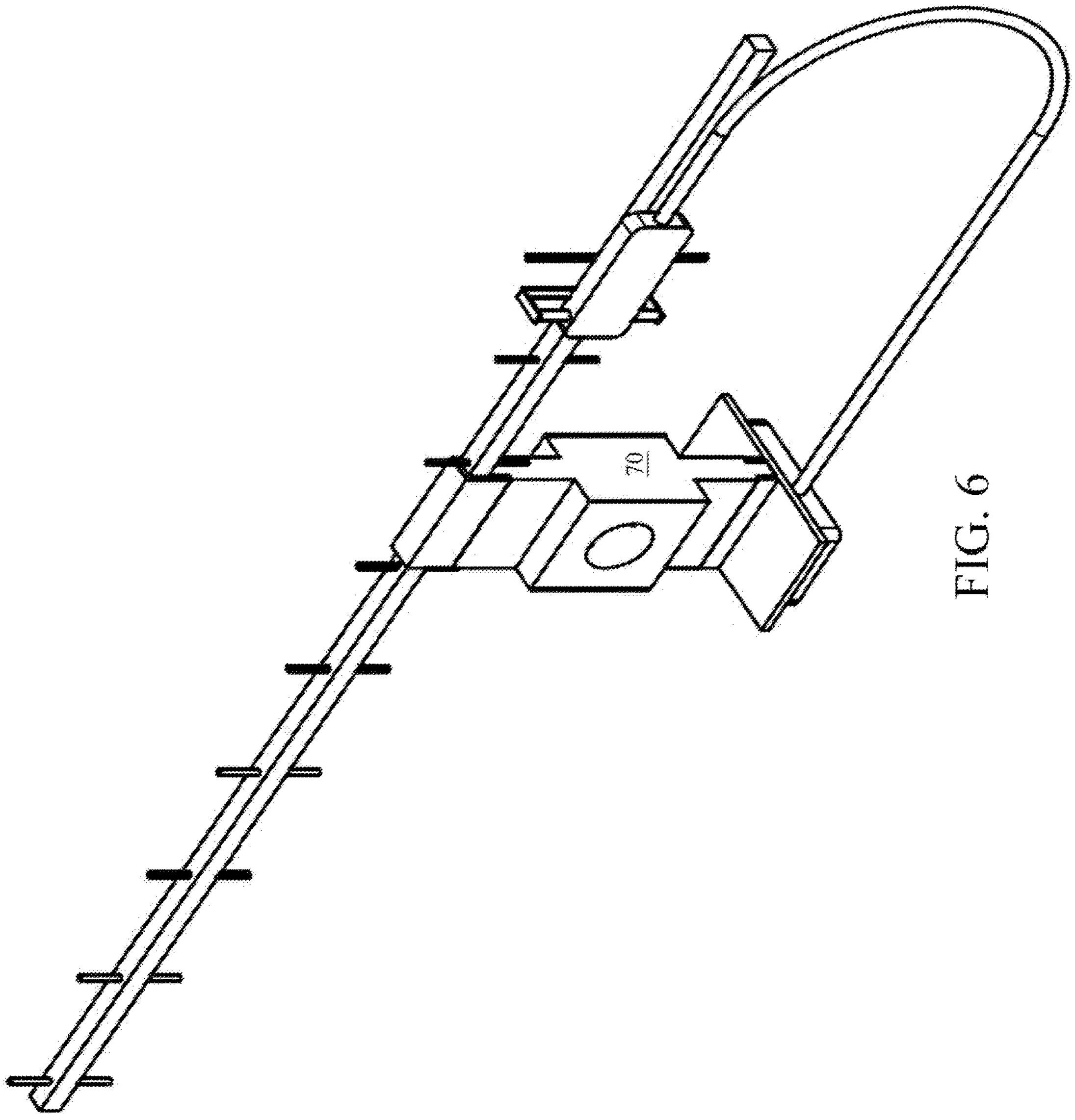
FIG. 6 is a perspective view of an example antenna, in this case a Yagi-Una antenna, with its corresponding attached transmitter, both attached to the antenna mounting bracket 70.

To illustrate the foregoing, FIG. 6 shows an example setup in which a Yagi-Una antenna and its associated radio component are attached to the antenna mounting bracket 70 of FIG. 5.

One skilled in the art will readily understand that other configurations of antenna mounting brackets 70 may suffice, the critical design criteria being that each antenna mounting bracket 70 secures both an antenna and its associated receiver on opposing sides of the rotating beam 9 in a manner which causes one to counterbalance the other. The result is net additional moment of inertia such that the net torque at the center of rod (9) about the x-axis is zero.

One skilled in the art should now understand that the above-described system is an improvement over conventional tracking platforms because its horizontal antenna mounting beam allows customers to swap in their own antenna elements and radios from multiple vendors without changing other antenna components, allows counterbalancing of the antenna(s) in order to minimize torque enabling the use of smaller, cheaper motors, and eliminates the need for additional counter weights. This, in turn, allows use of fiber-optic rotary joints or slip ring assemblies to pass data and video through the rotational coupling (in lieu of more expensive RF rotary joints), and reduces the size of the antenna system for convenient use on the ground or in the bed of a truck without a load bearing floor, or on a standard roof without needing additional structural support.

It should be understood that various changes may be made in the form, details, arrangement, and selection of the components. Such changes do not depart from the scope of the invention which comprises the matter shown and described herein and set forth in the appended claims.

The invention claimed is:

1. An antenna tracking platform, comprising:

a stationary bottom pedestal enclosing a rotary actuator assembly, said rotary actuator assembly further comprising an azimuth motor having a shaft and a pinion gear mounted on said shaft, said pinion gear engaging a peripheral gear encircling a hollow rotary stage constrained within a stationary base affixed to a top of said stationary bottom pedestal;

a support framework rotatably supported on the rotary stage for controlled-rotary motion about a single (z) axis, the support framework defining two tiers;

a horizontal antenna-mounting beam comprising a hollow tubular member rotatably supported in one of said two tiers of said support framework and protruding on both sides of the stationary bottom pedestal, an antenna-mounting beam having a first gear configured for controlled-rotary motion about a single (x) axis;

a stepper-motor mounted in another tier of said support framework for direct drive of said antenna-mounting beam, said stepper motor having a shaft and a second gear mounted on said stepper motor shaft and engaging and driving the first gear of said antenna-mounting beam.

2. The antenna tracking platform according to claim 1, wherein said support framework comprises an upper plate member, lower plate member and center plate member.

3. The antenna tracking platform according to claim 2, wherein said support framework comprises a plurality of spacer-struts for securing said upper plate member, lower plate member and center plate member together.

4. The antenna tracking platform according to claim 2, wherein said center plate member is defined by a central aperture for allowing engagement of the first gear and second gear there through.

5. The antenna tracking platform according to claim 1, wherein said stepper motor has a step angle within a range of from 1-2 degrees.

6. The antenna tracking platform according to claim 1, said antenna-mounting beam is rotatably supported within a lower tier by a pair of bearings.

7. The antenna tracking platform according to claim 6, said pair of bearings comprise pillow block bearings.

8. The antenna tracking platform according to claim 1, wherein said stepper motor extends a shaft through a spur gear into a pillow block bearing.

9. The antenna tracking platform according to claim 1, wherein said support framework is rotatably mounted to said stationary bottom pedestal by a fiber optic rotary joint (FORJ).

10. The antenna tracking platform according to claim 1, wherein said support framework is rotatably mounted to said stationary bottom pedestal by a slip ring assembly.

* * * * *